US 12,445,517 B2

United States Patent
Durán Alcaide et al.

(10) Patent No.: US 12,445,517 B2
(45) Date of Patent: Oct. 14, 2025

(54) FILE CONVERTER FOR RAN PARSER

(71) Applicant: EXFO Solutions SAS, Saint-Jacques de la Lande (FR)

(72) Inventors: Angel Durán Alcaide, Pontevedra (ES); Juan José Rubio Esteban, València (ES); Rubén Rosell Saborit, Castellón (ES)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 160 days.

(21) Appl. No.: 18/459,839

(22) Filed: Sep. 1, 2023

(65) Prior Publication Data
US 2024/0080356 A1    Mar. 7, 2024

Related U.S. Application Data

(60) Provisional application No. 63/441,914, filed on Jan. 30, 2023, provisional application No. 63/404,445, filed on Sep. 7, 2022.

(51) Int. Cl.
*H04L 67/06* (2022.01)
*H04L 67/1095* (2022.01)

(52) U.S. Cl.
CPC .......... *H04L 67/06* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 7,353,296 B2 | 4/2008 | Nuuttila | |
| 7,720,206 B2 | 5/2010 | Devolites et al. | |
| 8,463,617 B2 | 6/2013 | Ranous et al. | |
| 9,654,548 B2 | 5/2017 | Arai et al. | |
| 10,310,723 B2 * | 6/2019 | Rathod | G06F 3/04842 |
| 11,392,550 B2 | 7/2022 | Stowe et al. | |
| 2002/0154751 A1 | 10/2002 | Thompson, III et al. | |
| 2003/0125013 A1 | 7/2003 | Mizell et al. | |
| 2016/0255139 A1* | 9/2016 | Rathod | H04L 51/046 709/203 |
| 2019/0228093 A1* | 7/2019 | Falcao | G06F 16/24542 |

(Continued)

OTHER PUBLICATIONS

Toshniwal et al., "Media Streaming in Cloud with Special Reference to Amazon Web Services: A Comprehensive Review", May 1, 2020, IEEE, 2020 4th International Conference on Intelligent Computing and Control Systems (ICICCS) (2020, pp. 368-372) (Year: 2020).*

(Continued)

*Primary Examiner* — Davoud A Zand
(74) *Attorney, Agent, or Firm* — Baratta Law PLLC; Lawrence A. Baratta, Jr.; Ryan Odessa

(57) ABSTRACT

A method includes accessing files that are Call Trace logs and that are from a plurality of vendors and that operate in a mobile network; downloading the files that are within an appropriate date range, that are complete, and that have not been already downloaded; based on a corresponding vendor for a file of the files, converting the file to a streaming output; and sending the streaming output to a Trace Receiver service in a Radio Access Network (RAN) Parser that is configured to process streaming Call Trace messages.

18 Claims, 5 Drawing Sheets

(56) References Cited

U.S. PATENT DOCUMENTS

2021/0157858 A1* 5/2021 Stevens ................. G06F 40/237
2021/0263779 A1* 8/2021 Haghighat ............ G06F 9/5061

OTHER PUBLICATIONS

Tothfalusi et al., Assembling SIP-based VoLTE Call Data Records Based on Network Monitoring, Dec. 31, 2018 Article in Telecommunication Systems • Jul. 2018 [online], [retrieved on Aug. 23, 2019]. Retrieved from the Internet <URL: https://www.researchgate.net/publication/320783901_Assembling_SIP-based_VoLTE_Call_Data_Records_based_on_network_monitoring> <DOI: 10.1007/s11235-017-0400-6>.

* cited by examiner

FILE CONVERTER FOR RAN PARSER

CROSS-REFERENCE TO RELATED APPLICATION(S)

The present disclosure claims priority to U.S. Provisional Patent Application No. 63/441,914, filed Jan. 30, 2023, and U.S. Provisional Patent Application No. 63/404,445, filed Sep. 7, 2022, the contents of which are incorporated by reference in their entirety.

FIELD OF THE DISCLOSURE

The present disclosure relates generally to networking and computing. More particularly, the present disclosure relates to systems and methods for file conversion in a Radio Access Network (RAN) Parser.

BACKGROUND OF THE DISCLOSURE

In a telecommunications network, there are solutions for planning, troubleshooting and optimizing mobile networks using dynamic, geo-located devices, and subscriber data. A RAN Data Processing System (also referred to herein as a Parser, a RAN parser, and a parsing agent) is a scalable software adapter which collects and processes 2G, 3G, 4G and 5G 3rd Generation Partnership Project (3GPP) and vendor-specific RAN call events to generate call records and, optionally geolocated call records and real time location insights. The main output of RAN parser is a RAN user call data record (CDR) based on the messages provided by the network. This requires a correlation between different sources and messages found in the customer's information. And the aim is to provide the CDR as soon as the call in the network has finished.

BRIEF SUMMARY OF THE DISCLOSURE

The present disclosure relates to systems and methods for file conversion in a Radio Access Network (RAN) Parser. The present disclosure includes converting Call Trace logs, from different vendors, from file format to a streaming output, emulating the same behavior as if the data was stream by network elements themselves. In various embodiments, the present disclosure can include a method having steps, a processing device configured to implement the steps, and a non-transitory computer-readable medium storing instructions for programming one or more processors to implement the steps. The steps include accessing files that are Call Trace logs and that are from a plurality of vendors and that operate in a mobile network; downloading the files which are (1) within an appropriate date range, (2) complete, and (3) have not been already downloaded; based on a corresponding vendor for a file of the files, converting the file to a streaming output; and sending the streaming output to a service configured to process streaming Call Trace messages. Network elements in the mobile network from the plurality can be configured to provide the files.

The steps can further include, for other vendors of network elements that support streaming Call Trace messages, sending the streaming Call Trace messages to the service. The streaming output can be a Transmission Control Protocol (TCP stream). The streaming output can be sent to a given port based on one or more of wireless technology and vendor. The RAN Parser can only accept streaming outputs as input, for processing efficiency. The streaming output can emulate a same behavior as a vendor streamer. The files can be complete based on a stable file size based on plurality of checks. The files that have not been already downloaded can be based on a check in a database.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
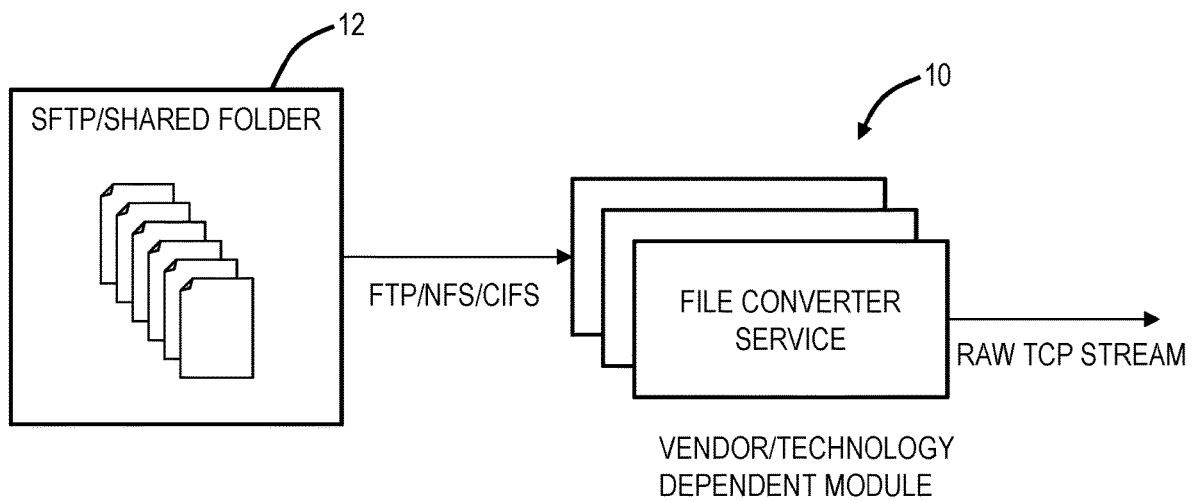
FIG. 1 is a diagram of a File Converter Service for a RAN Parser.

Again, the present disclosure relates to systems and methods for file conversion in a Radio Access Network (RAN) Parser. The present disclosure includes converting Call Trace logs, from different vendors, from file format to a streaming output, emulating the same behavior as if the data was stream by network elements themselves. A method includes accessing files that are Call Trace logs and that are from a plurality of vendors and that operate in a mobile network; downloading the files that are within an appropriate date range, that are complete, and that have not been already downloaded; based on a corresponding vendor for a file of the files, converting the file to a streaming output; and sending the streaming output to a Trace Receiver service in a Radio Access Network (RAN) Parser that is configured to process streaming Call Trace messages.

The present disclosure includes a Cloud Native Parser that reproduces the behavior of the current Parsers via a new architecture that requires changes in terms of how the information is processed how it is distributed along the different elements, how it is generated and how it is sent out of the system. The Cloud Native Parser aims to replace the legacy architecture making it more flexible and able to be deployed in several pieces along different locations (edge, central, etc.) in a customer network in front of the monolithic version where only the central site deployment was allowed.

RAN Parser

RAN parsers require Call Traces (CTs) as inputs. CTs are generated by Network Elements (NEs) from the client's mobile network and have a vendor proprietary format depending on

- the vendor itself: e.g., Huawei, Nokia, Ericsson, Samsung, ZTE . . . .
- the technology of the mobile network: 2G, 3G, 4G, 5G, etc.
- the trace format: e.g., there are Huawei 4G traces in format "TRC" and Huawei 4G traces in format SDTSIG, and not only the format changes but also the content (there is information present in one but not in the other and vice versa)
- the trace release: there can be internal changes between vendor release X.1 and vendor release X.2 of a certain trace format (changes in existent information, addition of new information, deprecation of existent information)

The present disclosure includes a RAN parser that is multi-vendor and multi-technology, meaning it supports (1) as many as possible input format variations described above, and (2) provides outputs with a common structure for all of them (agnostic output). In order to address a RAN parser that is multi-vendor, multi-technology, the present disclosure includes an approach to convert the input into a vendor/technology agnostic format as soon as possible in the system pipeline, limiting the impact of input variation evolutions to a single module, simplifying the processing after the ingestion and decreasing the computation power.

File Converter Service

Call Traces can be file-based or a Transmission Control Protocol (TCP) stream depending on the vendor and the technology. There is a need for a Parser that supports TCP streams. The present disclosure includes a File Converter module that converts file-to-stream at the beginning of the pipeline only if a specific project needs it. Both files and TCP Streams have vendor dependent formats, and relationship between files needs to be discovered.

Figure 2:
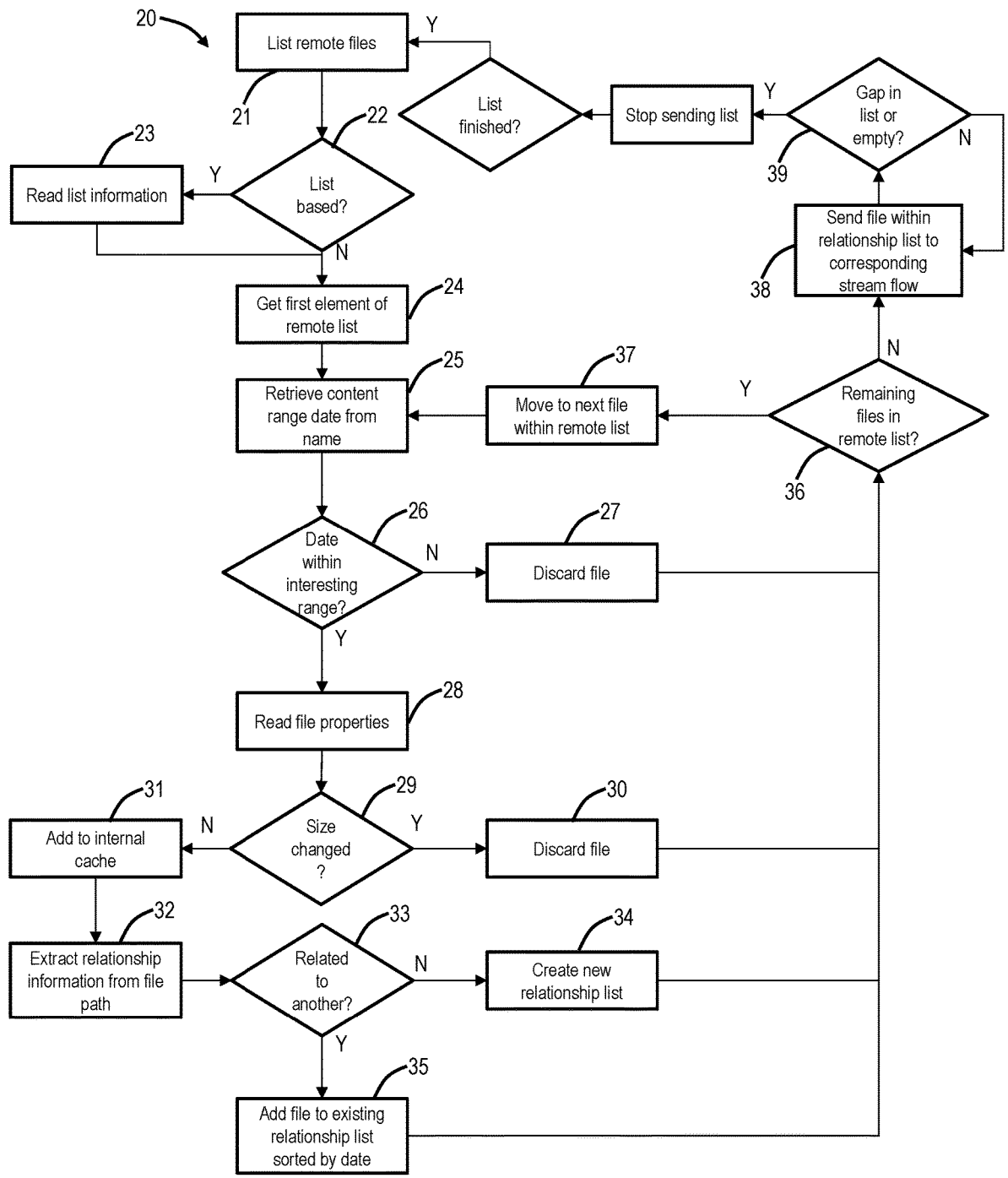
FIG. 2 is a flowchart of a process for file conversion, implemented by the File Converter Service.
Figure 3:
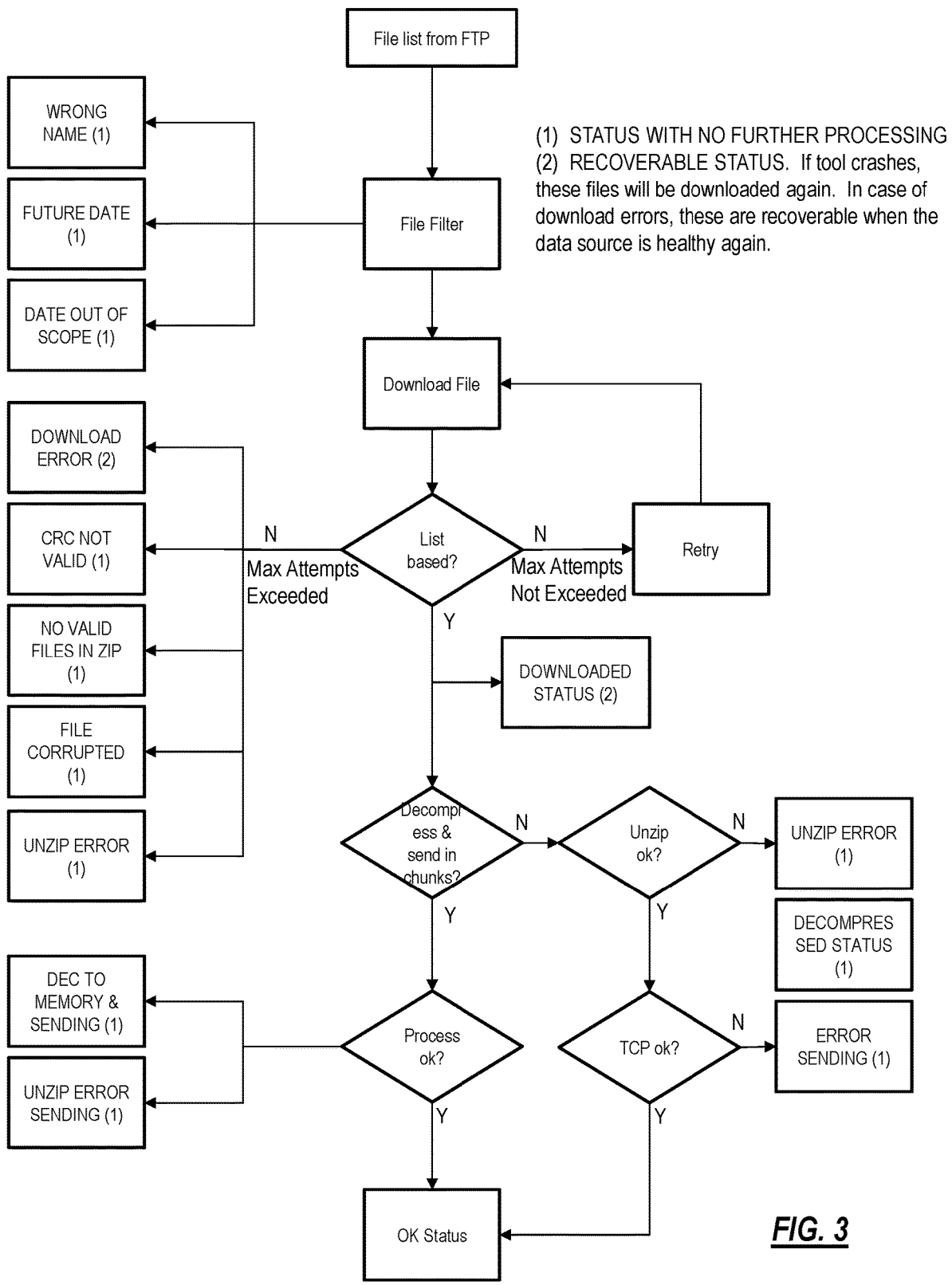
FIG. 3 is a flowchart of a process for trace status management.

FIG. 1 is a diagram of a File Converter Service 10 for a RAN Parser. FIG. 2 is a flowchart of a process for file conversion, implemented by the File Converter Service 10. FIG. 3 is a flowchart of a process for trace status management.

The present disclosure provides a methodology of File Converter inferring the relationship between files and emulating the same behavior as the vendor's streamer. Vendor specific processing is not coded and is provided by configuration. The File Converter Service 10 has the following characteristics We convert file input, managed in a different way by each vendor, into streaming output, so the Parser works always with streaming as input Output stream is vendor dependent and emulates the same behavior as the vendor streamer Relationship between files is inferred and related files are sent sorted within the same data flow/stream Relationship inference is performed based on files characteristics without the need of reading the file content Vendor specific processing is not coded and is provided by configuration Can be deployed at the edge instead of in a centralized monolithic location In an embodiment, the RAN Parser supports input TCP streams natively because it is faster than working with file-based inputs and the Parser aims to create near real time outputs.

Summarizing the downsides of files:

We need to manage one or several File Transfer Protocol (FTP) connections, inspect when new files appear on folders/subfolders, be sure the file is completely uploaded to the FTP server before trying to download it, decompress it, etc. The specific connection behavior is different per vendor We also need to manage file characteristics such as file names, file order, cadence, extension, and root folder. They indicate the specific Network Element generating them, the time span to which the contained messages will be related to and the type of information contained within (depending on vendor/technology, some content is separated in different file extensions, for example vendor 1 Call Trace format generates files .log containing vendor messages and files .sig containing 3GPP standard messages)

There are also vendor limitations:

The files generated by Network Elements often have a maximum size themselves. If for example a file is generated every 5 minutes but by minute 3 the maximum file size is reached, depending on the vendor, a second file for the period may not be generated and calls happening under the Network Element the last 2 minutes may not be recorded in any file. A third party cannot know the number of calls not recorded In other cases, the vendor establishes a maximum number of concurrent calls that the NE can record into the file. A third party cannot know the number of calls not recorded.

In the end, TCP streams are the faster way to access the information being directly generated by each Network Element.

The File Converter Service 10 is configured to receive files, such as from a Secure FTP (SFTP), shared folder 12, etc., via FTP, Network File System (NFS), Common Internet File System (CIFS) protocol, etc. and converts the files into a raw TCP stream.

FIG. 2 illustrates a process 20 for file conversion, implemented by the File Converter Service 10. All the data needed for performing all the decisions within the algorithm is retrieved from the information that can be collected from the remote repository (filename, file path, file size, etc.). It avoids the need to understand and read the content of the files, saving processing time and extra vendor dependency. The order in the decision tree is relevant to avoid wasting time in processing, to the extent possible, increasing the performance of the tool.

The process 20 includes a list of remote files (step 21). The remote files can be list-based (step 22) where the list information is read (step 23) or not, then the process 20 includes getting a first element of a remote list (step 24). The process 20 includes retrieving content range date from the name (step 25), and if the date is not within a range of interest (step 26), the file is discarded (step 27). If the date is within a range of interest (step 26), the file properties are read (step 28). The file properties size is check (step 29), and if the size has changed, the file is discarded (step 30). If not (step 29), the file is added to the internal cache (step 31), and relationship information is extracted from the file path (step 32). The process 20 checks if the file is related to another file (step 33), and if not, a new relationship list is created (step 34). If so (step 33), the file is added to an existing relationship list, sorted by date (step 35).

After steps 27, 30, 34, and 35, the process 20 checks if there are remaining files (step 36), and if so, the process 20 moves to the next file within the remote list (step 37), and back to step 25. If not (step 36), the process 20 sends the relationship list to a corresponding stream flow (step 38), which keeps sending until empty or there is a gap (step 39).

The New architecture of the RAN Parser can be designed to work only with streaming input mode. Although most current vendors are migrating Network Element (NE) output to generate streaming instead of files, system still needs to support file-based input.

In an embodiment, the File Converter Service 10 can support traces for the following example vendors, among others:

Ericsson: Both output modes

Huawei: File mode

Samsung: Streaming mode
Nokia: Streaming mode (depending on connection through Nokia GEO Server or not)
ZTE: File mode In an embodiment, the File Converter Service 10 can support getting files through:
FTP
SFTP
FTPS (SSL/TLS): Two methods are supported: Implicit and Explicit The File Converter Service 10 can check periodically these repositories searching for new files. It considers that sometimes a NE generates the files directly on the repository and they are accessible from the beginning, so the File Converter Service 10 ensures not to download files before they are completely generated. Instead of downloading the file as soon as it has been seen on the repository, it should be checked at least two times if file is still growing or not (size changes in step 29).

In an example implementation, the File Converter Service 10
 checks that the file size is stable a couple of times
 checks performed with a spacing of several seconds. The minimum time between checks has been set to 5 seconds For some data sources, a file is available with the Uniform Resource Locator (URL) of all the log traces generated in the last X minutes. This file allows the File Converter Service 10 not to check iteratively every subfolder searching for new files. It can download these files, open them, and get the list of traces to be downloaded directly from them. This is important for some data sources where eNBs generate files every few minutes (sometimes seconds) in its own subfolder. This mechanism allows the service to list all new files faster than having to get into every single subfolder. Some vendors provide this file automatically but the File Converter Service 10 can alternatively generate this file.

To avoid processing all files and increase performance, some filtering mechanisms are supported:
 Filter by date: all files with a date older than a defined value will not be processed
 Filter by Network Element (NEs): Data from different NEs can be stored together in the same remote server, in order to save time, based on file path, the files can be excluded from the process if they are not considered within the NE list of interest.
 Check folder date: if this option is enabled, all the folders starting with a date and not matching today will be discarded. A protection delay is provided to avoid losing folders when the day changes.

Usually, information from all Network Elements is stored in just a few FTPs, even in just one. One single service cannot manage all files from all NEs, so it is necessary to implement a mechanism to distribute NEs between different services. In this architecture all the service replicas use the same configuration. In order to be able to select from each replica service which set of NEs should be processed, each service relies on provided cloud facilities that allows to identify the replica by means of environment variables.

Tracking Files

Files are stored in customer repositories for a while, so the File Converter Service 10 needs to know which files have been already downloaded to avoid re-processing them. This information is kept for persistency in a database, that is periodically updated, and as cache within each service. Services are database agnostic, allowing to attach them to any database with Structured Query Language (SQL) capabilities.

Tracking Data

In order to keep all the files identified within the database, they are persisted associated with the following information:

TABLE 1

Tracking parameters

| Parameter | Description |
| --- | --- |
| Id | Unique identifier (bigint) |
| Name | File name |
| file_date_local | Date extracted from the file name (local time) |
| data_source_id | Identifier of the input server from which the file was downloaded |
| file_converter_id | Identifier of the service that has downloaded this file |
| file_status_id | Status |
| compressed_file_size_bytes | Size of the compressed file in bytes |
| decompressed_file_size_bytes | Size of the decompressed file in bytes. |
| downloaded_date_local | Date and time when the file was downloaded |
| decompressed_date_local | Date and time when the file was unzipped |
| download_time_ms | Time to download the file in milliseconds. |
| decompression_time_ms | Time to decompress the file in milliseconds. |

This information allows to know all the files already seen by the different services and the state in which the processing of the file is, that allows to recover the processing of a file from the latest processing performed if a failure happens.

Field Status can be set on one of the following values depending on how download process has gone:

TABLE 2

File status values

| ID | Key | Description |
| --- | --- | --- |
| 0 | UNDEFINED | The initial status when building an FtpFile object. It should not appear in the DB |
| 1 | WRONG_NAME | The file cannot be parsed. Filtered before downloading. |
| 2 | DATE_OUT_OF_SCOPE | Date previous to user's 'hoursToStartDownloadingFrom'. Filtered before downloading |
| 3 | FUTURE_DATE | A date past now. Filtered before downloading. |
| 4 | DOWNLOAD_ERROR | The download failed (probably the FTP server is down). If it wakes up, these files are recoverable. |
| 5 | CRC_NOT_VALID | The file gives ZIP Cyclic Redundancy Check (CRC) errors after download retrials. Filtered before downloading. |

TABLE 2-continued

File status values

| ID | Key | Description |
|---|---|---|
| 6 | NO_VALID_FILES_IN_ZIP | The zip contains no files after download retrials. Filtered before downloading. |
| 7 | FILE_CORRUPTED | The downloaded file size is not correct after retrials. Filtered before downloading. |
| 8 | DOWNLOADED | File downloaded but not sent yet. If the file-converter crashes, these are recoverable |
| 9 | DEC_TO_MEMORY_SENDING | File downloaded, decompressing & sending in chunks. If the file-converter crashes, the filter will apply to avoid duplicates in the parser |
| 10 | UNZIP_ERROR_SENDING | While sending in chunks, a ZIP error was detected. If the file-converter crashes, the filter will apply to avoid duplicates. |
| 11 | ERROR_SENDING | TCP errors in the middle of the transmission. The file will be filtered to avoid duplicates. |
| 12 | UNZIP_ERROR | The compression format is not supported. No need to retry because will be filtered |
| 13 | DECOMPRESSED | The file has been decompressed but not sent yet. If the file-converter crashes, these files are not recoverable since we do not know if these files have been sent. |
| 14 | OK | The file has been sent without errors |

Files should be processed/downloaded in the right chronological order. For ordering files, it is preferred to use the date extracted from the file name rather than use the "Last modification" field.

FIG. 3 depicts the implementation and transition between different statuses.

Vendor Specific Processing

As stated before, the processing of the files is vendor dependent. This vendor specific processing is not hardcoded and is managed by configuration making the service extensible without recoding it. As an example, for vendor 2, date is extracted from log name using the following regular expression:

A(?<Date>\d{8})\.(?<StartHour>\d{4})(?<StartGmtSign>[+]{1})?(?<StartGmt>\d{4})?-(?<EndHour>\d{4})(?<EndGmtSign>[+−]{1})?(?<EndGmt>\d{4})?(?<Info>[\w?_=+−,]{1,})

And this date in turn indicates the dates of the messages contained in the file.

Decompression

Service downloads and decompresses files directly in memory as preferred option. Once file is unzipped, data is sent via TCP to the next service. To prevent RAM problems, service supports downloading big files to disk and TCP transmission in chunks while decompressing.

1Output

The File Converter Service 10 will generate a different stream for each file group read (each file is related to a determined Network Element, so files are grouped by them). Depending on vendor, traces will be available with a different cadence, sometimes every few seconds sometimes every fifteen minutes. Having this in mind, it has no sense to keep TCP connection opened for a long time, so for each file a new stream could be opened and closed. It could be helpful for balancing traffic between all Trace Receiver Services running. As described herein, a Trace Receiver Service is a module in the RAN Parser that process Call Trace Messages.

Regarding to discard files waiting to be converted into stream and accumulated for whatever reason, the file converter will not discard data. It will be put on hold expecting that the time lost will be recovered at some point.

Port Mapping

The File Converter Service 10 needs to know to which port information needs to be sent depending on the file (vendor and technology). This mapping will be provided by configuration globally to all the services.

Example Implementation of Port Mapping

TABLE 3

Port mapping per vendor

| Technology | Vendor | portMapping (config.json) |
|---|---|---|
| 4G | vendor1 | vendor1-4g: 9445 |
| 4G | vendor2 | vendor2-4g: 9446 |
| 4G | vendor3 | vendor3-4g: 9447 |
| 5G | vendor1 | vendor1-5g: 9448 |
| 5G | vendor2 | vendor2-5g: 9449 |

Process

Figure 4:
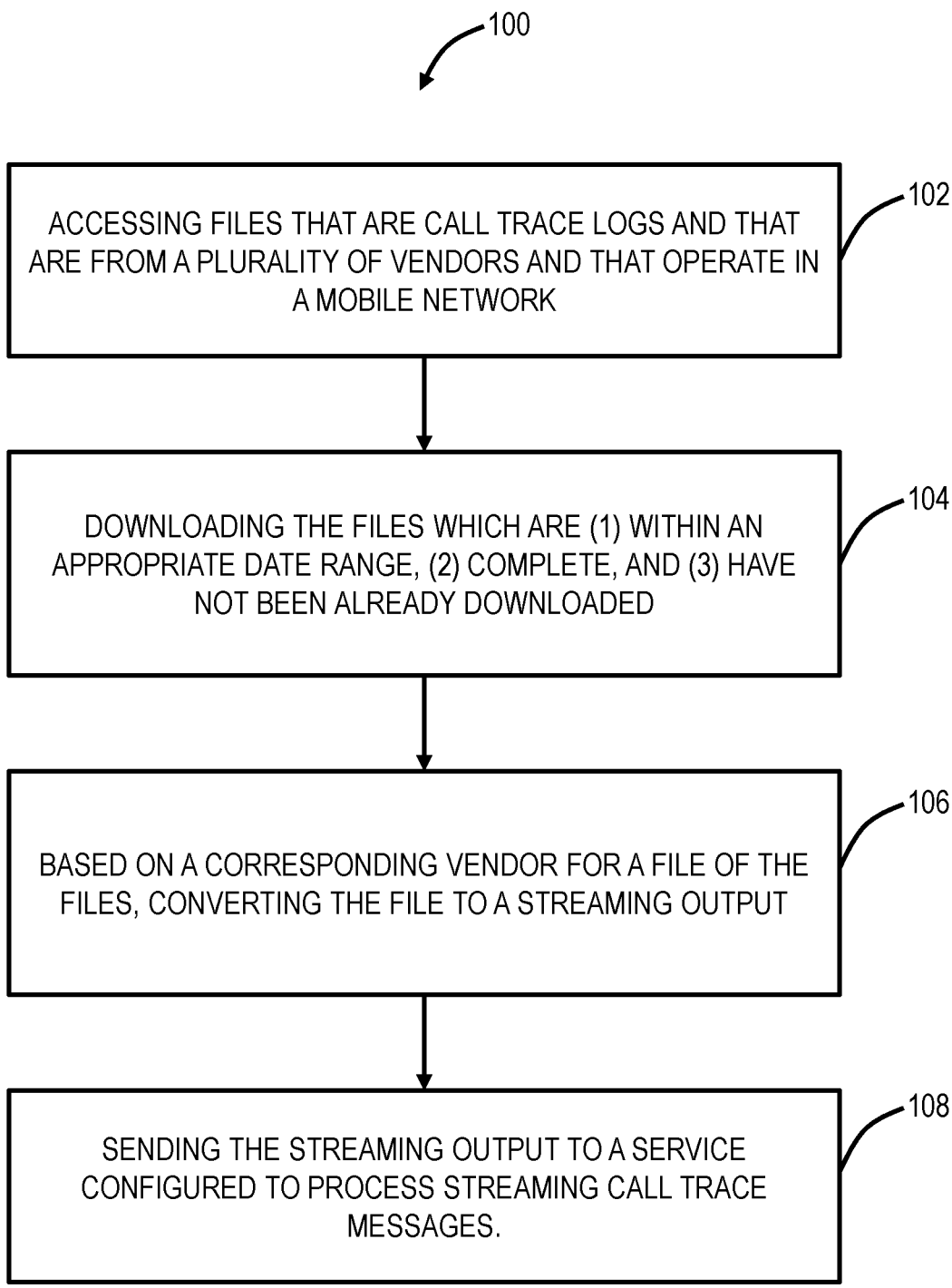
FIG. 4 is a flowchart of a process for file conversion in a Radio Access Network (RAN) Parser

FIG. 4 is a flowchart of a process 100 for file conversion in a Radio Access Network (RAN) Parser. The process 100 contemplates implementation as a method having steps, via a processing device configured to implement the steps, via a cloud service configured to implement the steps, and/or as non-transitory computer-readable medium with instructions that, when executed, cause one or more processors to implement the steps.

The process 100 includes accessing files that are Call Trace logs and that are from a plurality of vendors and that operate in a mobile network (step 102); downloading the files which are (1) within an appropriate date range, (2) complete, and (3) have not been already downloaded (step 104); based on a corresponding vendor for a file of the files, converting the file to a streaming output (step 106); and sending the streaming output to a service configured to process streaming Call Trace messages (step 108). For example, the service can be a Trace Receiver service in a Radio Access Network (RAN) Parser.

Network elements in the mobile network from the plurality can be configured to provide the files. The process 100 can further include, for other vendors of network elements that support streaming Call Trace messages, sending the streaming Call Trace messages to the Trace Receiver service. The streaming output can be a Transmission Control Protocol (TCP stream). The streaming output can be sent to a given port based on one or more of wireless technology and vendor. The RAN Parser can only accept streaming outputs as input, for processing efficiency. The streaming output can emulate a same behavior as a vendor streamer. The files can be complete based on a stable file size based on plurality of checks. The files that have not been already downloaded can be based on a check in a database.

Processing System

Figure 5:
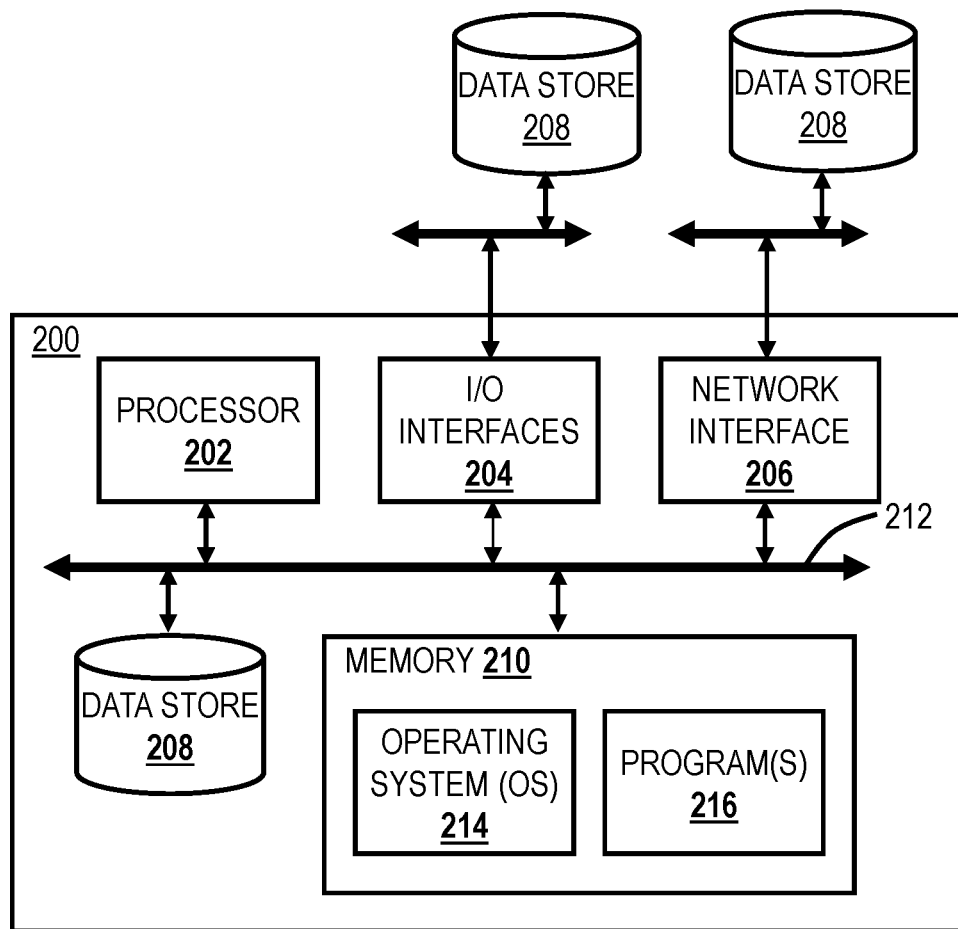
FIG. 5 is a block diagram of a processing system, which may be used to implement the process.

FIG. 5 is a block diagram of a processing system 200, which may be used to implement the process 100. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an embodiment, one or more processing devices 200 can be configured in a cluster and/or in a cloud system, for implementing the process 100. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
    accessing files that are Call Trace logs and that are from a plurality of vendors and that operate in a mobile network;
    downloading the files which are (1) within an appropriate date range, (2) complete, and (3) have not been already downloaded, wherein file completeness is ensured by performing periodic checks to determine if the files are not growing in size, thereby verifying that the files are completely generated before downloading;
    based on a corresponding vendor for a file of the files, converting the file to a streaming output; and
    sending the streaming output to a service configured to process streaming Call Trace messages.

2. The method of claim 1, wherein network elements in the mobile network from the plurality are configured to provide the files.

3. The method of claim 1, wherein the steps further include:
    for other vendors of network elements that support streaming Call Trace messages, sending the streaming Call Trace messages to the service.

4. The method of claim 1, wherein the streaming output is a Transmission Control Protocol (TCP stream).

5. The method of claim 1, wherein the streaming output is sent to a specific port based on a combination of wireless technology and vendor associated with each of the files.

6. The method of claim 1, wherein the RAN Parser only accepts streaming outputs as input, for processing efficiency.

7. The method of claim 1, wherein the streaming output emulates a same behavior as a vendor streamer.

8. The method of claim 1, wherein the files that have not been already downloaded are based on a check in a database.

9. The method of claim 1, wherein the downloaded files are sorted based on time, and the converting and sending is based thereon.

10. A processing system comprising:
    one or more processors; and
    memory storing instructions for programming the one or more processors to
        access files that are Call Trace logs and that are from a plurality of vendors and that operate in a mobile network;
        download the files which are (1) within an appropriate date range, (2) complete, and (3) have not been already downloaded, wherein file completeness is ensured by performing periodic checks to determine if the files are not growing in size, thereby verifying that the files are completely generated before downloading;
        based on a corresponding vendor for a file of the files, convert the file to a streaming output; and
        send the streaming output to a service configured to process streaming Call Trace messages.

11. The processing system of claim 10, wherein network elements in the mobile network from the plurality are configured to provide the files.

12. The processing system of claim 10, wherein the steps further include:
    for other vendors of network elements that support streaming Call Trace messages, sending the streaming Call Trace messages to the service.

13. The processing system of claim 10, wherein the streaming output is a Transmission Control Protocol (TCP stream).

14. The processing system of claim 10, wherein the streaming output is sent to a specific port based on a combination of wireless technology and vendor associated with each of the files.

15. The processing system of claim 10, wherein the RAN Parser only accepts streaming outputs as input, for processing efficiency.

16. The processing system of claim 10, wherein the streaming output emulates a same behavior as a vendor streamer.

17. The processing system of claim 10, wherein the files that have not been already downloaded are based on a check in a database.

18. A non-transitory computer-readable medium comprising instructions for programming one or more processors to perform steps of:
    accessing files that are Call Trace logs and that are from a plurality of vendors and that operate in a mobile network;
    downloading the files which are (1) within an appropriate date range, (2) complete, and (3) have not been already downloaded, wherein file completeness is ensured by performing periodic checks to determine if the files are not growing in size, thereby verifying that the files are completely generated before downloading;

based on a corresponding vendor for a file of the files, converting the file to a streaming output; and sending the streaming output to a service configured to process streaming Call Trace messages.

* * * * *